(12) United States Patent
Bittencourt

(10) Patent No.: US 8,642,004 B2
(45) Date of Patent: Feb. 4, 2014

(54) PROCESS FOR THE PRODUCTION OF HYDROGEN FROM ETHANOL

(75) Inventor: Roberto Carlos Pontes Bittencourt, Rio de Janeiro (BR)

(73) Assignee: Petroleo Brasileiro S.A.—Petrobras, Rio de Janeiro (BR)

( * ) Notice: Subject to any disclaimer, the term of this patent is extended or adjusted under 35 U.S.C. 154(b) by 0 days.

(21) Appl. No.: 13/212,772

(22) Filed: Aug. 18, 2011

(65) Prior Publication Data

US 2012/0070367 A1    Mar. 22, 2012

(30) Foreign Application Priority Data

Aug. 18, 2010 (BR) ..................................... 1002970

(51) Int. Cl.
*C01B 3/16* (2006.01)
*C01B 3/38* (2006.01)

(52) U.S. Cl.
USPC .......................................... 423/656; 252/373

(58) Field of Classification Search
USPC ....................................................... 423/656
See application file for complete search history.

(56) References Cited

U.S. PATENT DOCUMENTS

| | | | | |
|---|---|---|---|---|
| 4,238,371 A * | 12/1980 | Finch | ............................ | 502/318 |
| 7,585,339 B2 * | 9/2009 | Dahl et al. | ............... | 48/197 FM |
| 2008/0019902 A1 * | 1/2008 | Rei et al. | ....................... | 423/652 |

FOREIGN PATENT DOCUMENTS

GB    2 046 779    * 11/1980

OTHER PUBLICATIONS

Jie Sun, et al., "$H_2$ from steam reforming of ethanol at low temperature over $Ni/Y_2O_3$, $Ni/La_2O_3$ and $Ni/Al_2O_3$ catalysts for fuel-cell application", International Journal of Hydrogen Energy, 2005, pp. 437-445, vol. 30.

Jie Sun, et al., "Hydrogen from steam reforming of ethanol in low and middle temperature range for fuel cell application", International Journal of Hydrogen Energy, 2004, pp. 1075-1081, vol. 29.

* cited by examiner

*Primary Examiner* — Melvin C Mayes
*Assistant Examiner* — Kenneth Vaden
(74) *Attorney, Agent, or Firm* — Sughrue Mion, PLLC

(57) ABSTRACT

Using the process described in the present invention, a gas is produced that is rich in methane and hydrogen and has a content of olefins below 1% v/v, which fully meets the necessary requirements for raw materials used for large-scale production of hydrogen or synthesis gas, in steam reforming units that already exist in a great many oil refineries and petrochemical units. Starting from ethanol, steam, nickel-based catalysts and the use of appropriate conditions of temperature, and $H_2O$/ethanol and $H_2$/ethanol molar ratios, the invention teaches the production of hydrogen and synthesis gas from biomass, stably for long periods without loss of catalyst performance over time, permitting its industrial application in new units or in existing units. As a solution for the production of ethanol, the present invention claims the replacement of the ZnO-based and hydrofining catalysts of the feed pre-treatment section, with nickel-based catalysts and process conditions in accordance with the present invention.

16 Claims, No Drawings

PROCESS FOR THE PRODUCTION OF HYDROGEN FROM ETHANOL

FIELD OF THE INVENTION

The present invention relates to the field of catalytic steam reforming processes and the catalysts used in these processes. The production of hydrogen from biomass, in particular from ethanol, is of considerable interest for new industrial units and fuel cells and is the object of the present invention.

BACKGROUND OF THE INVENTION

The process most used for the production of hydrogen on an industrial scale is steam reforming. This is a process with several steps with different operating conditions and catalysts. In the step called "steam reforming", which uses catalyst of the nickel type on refractory supports, such as alumina, calcium aluminate or magnesium aluminate, the main reactions that occur are:

| | |
|---|---|
| $C_nH_m + n\, H_2O \rightarrow CO + (n + m/2)\, H_2$ | $\Delta H_0^{298} < 0$ |
| $CH_4 + H_2O \rightarrow CO + 3\, H_2$ | $\Delta H_0^{298} = +206.2\ kJ/mol$ |
| $CO + H_2O \rightarrow CO_2 + H_2$ | $\Delta H_0^{298} = -41.2\ kJ/mol$ |

The raw materials used for the steam reforming process are natural gas, refinery gas, propane, butane, liquefied petroleum gas or naphtha.

The use of renewable raw materials (biomass), such as ethanol, for the production of hydrogen will make it possible to reduce the emission of $CO_2$ in the overall balance, since these raw materials fix $CO_2$ from the atmosphere. Despite the environmental benefits, the technology for the large-scale production of $H_2$ from ethanol has not yet been consolidated technically.

Deactivation of the catalysts used in the steam reforming process by the formation of coke is the main difficulty to be solved, to make the production of hydrogen from ethanol industrially viable. Ethylene formed from the dehydration of ethanol is one of the main compounds promoting coke formation in the steam reforming of ethanol. In an industrial unit for steam reforming from natural gas or refinery gas, the maximum ethylene content considered to be permissible in the feed is around 1% v/v. Above this value the loss of activity of the catalysts makes the process economically unviable.

One technical solution that is being investigated is the development of catalysts that are more resistant to deactivation by coke deposition. Some of the types of catalysts investigated are: oxides and mixed oxides such as MgO, $Al_2O_3$, $V_2O_5$, ZnO, $TiO_2$, $La_2O_3$, $CeO_2$, $Sm_2O_3$, $La_2O_3$—$Al_2O_3$, $CeO_2$—$Al_2O_3$, MgO—$Al_2O_3$; supported Co such as Co/$Al_2O_3$, Co/$La_2O_3$, Co/$SiO_2$, Co/MgO, Co/$ZrO_2$, Co/ZnO, Co/$TiO_2$, Co/$V_2O_5$, Co/$CeO_2$, Co/$Sm_2O_3$, Co/$CeO_2$—$ZrO_2$, Co/C; supported Ni such as Ni/$La_2O_3$, Ni($La_2O_3$—$Al_2O_3$), Ni/$Al_2O_3$, Ni/MgO, Ni—Cu/$SiO_2$, Ni—Cu/$Al_2O_3$, Ni—Cu—K/$Al_2O_3$; Cu supported on $Nb_2O_5$—$Al_2O_3$ and on ZnO—$Al_2O_3$; supported precious metals such as Rh on $TiO_2$, $SiO_2$, $CeO_2$, $ZrO_2$, $Al_2O_3$, MgO and $CeO_2$—$ZrO_2$, Pt on $CeO_2$, Pd on $CeO_2$, $Al_2O_3$ and C; metal alloys such as Rh—Au/$CeO_2$, Rh—Pt/$CeO_2$ and Pt—Pd/$CeO_2$.

However, these catalysts still have limitations for industrial use, such as: they do not have sufficient resistance to deactivation by coke formation or sintering of the active phase; they are expensive as they are based on precious metals or they form by-products, such as acetaldehyde, acetates, acetone and ethylene, which make it difficult to purify the hydrogen (or the synthesis gas) produced or cause difficulties and/or additional costs due to contamination of the condensate generated in the process from the water used in excess of the stoichiometry of the reaction.

A second technical solution, and the purpose of the present invention, would be prior conversion of the ethanol to raw materials used industrially, which converts the ethanol to a gas rich in methane and free from olefins and other organic contaminants, such as acetaldehydes, ketones, acetates and others, by combining process conditions and suitable catalysts that give low coke formation. This gas can then be used as feed for a conventional unit for production of hydrogen that uses natural gas, liquefied petroleum gas, refinery gas, naphtha or combinations thereof, as raw materials.

The production of hydrogen by steam reforming of ethanol can be presented by the following reaction:

$$C_2H_5OH + 3H_2O \rightarrow 2CO_2 + 6H_2$$

In practice, various other reactions may occur, depending on the type of catalyst and the operating conditions used, such as:

a) formation of ethylene by the reaction of dehydration of ethanol.

$$C_2H_5OH \rightarrow C_2H_4 + H_2O$$

b) formation of acetaldehyde by dehydrogenation of ethanol.

$$C_2H_5OH \rightarrow C_2H_4O + H_2$$

c) decomposition of ethanol and the reaction of steam reforming of ethanol or of intermediates producing CO, $CO_2$ and $CH_4$.

$$C_2H_5OH \rightarrow CH_4 + H_2$$

$$C_2H_4O + H2O \rightarrow CH_4 + CO_2 + H_2$$

$$C_2H_4 + H_2O \rightarrow CH_4 + CO + H_2$$

$$C_2H_4 + 2H_2O \rightarrow CH_4 + CO_2 + 2\, H_2$$

Catalysts containing precious metal tend to have greater resistance to coke formation than the equivalent catalysts using nickel as the active phase. However, their costs of production are higher, which tends to make their industrial use unviable. Accordingly, although they have been known for a long time, these catalysts based on precious metals have not found industrial application in large-scale production of hydrogen.

Industrially, the catalysts used for the production of hydrogen from natural gas, propane, butane, liquid petroleum gas, refinery gas or naphtha, in units of large capacity (defined here as having a production capacity above 10 000 $Nm^3$/day), comprise nickel supported on refractory materials, such as: alumina, calcium aluminate or magnesium aluminate, and can be promoted with other elements, such as alkali metals (especially potassium) and rare earths (especially lanthanum).

Nickel-based catalysts can suffer serious deactivation by coke formation when used for the steam reforming of ethanol, the rate of coke formation depending on the type of catalyst and the operating conditions.

The catalyst of the Ni/$Al_2O_3$ type displays good activity and selectivity for the production of hydrogen at temperatures above 550° C. At lower temperatures, ethylene can be obtained, accompanied by rapid loss of activity associated with the deposition of coke.

The tendency for coke formation, on supported nickel catalysts, in the steam reforming of ethanol is well known. Sun and co-workers report in the publications J. Sun, X. P. Qiu, F. Wu, W. T. Zhu, "$H_2$ from steam reforming of ethanol at low temperature over Ni/Y2O3, Ni/La2O3 and Ni/Al2O3 catalysts for fuel-cell", International Journal of Hydrogen Energy 30 (2005) 437-445 and J. Sun, X. Qiu, F. Wu, W. Zhu, W. Wang, S. Hao, "Hydrogen from steam reforming of ethanol in low and middle temperature range for fuel cell application", International Journal of Hydrogen Energy 29 (2004) 1075-1081 that have used catalysts of the $Ni/Y_2O_3$, $Ni/La_2O_3$ and $Ni/Al_2O_3$ type. The authors taught that the use of supports that are free from acidity, at temperatures above 380° C., reduces coke formation.

The invention described in WO 2009/004462A1 teaches producing hydrogen and carbon nanotubes (a special type of coke) from the decomposition of ethanol on nickel-based catalysts supported on lanthanum.

The results disclosed show that the performance of nickel-based catalysts, for the production of hydrogen from ethanol, is applicable to existing industrial units for production of hydrogen, but can be improved further. A technique described in the literature for the production of hydrogen from ethanol, called autothermal reforming, involves addition of oxygen to the mixture of ethanol and steam.

WO2009/009844A2 teaches the addition of oxygen in the feed of ethanol and steam, associated with the use of special catalysts, based on cerium oxide, with promoters selected from the group comprising alkali metals and the lanthanides, for the production of $H_2$ from ethanol.

Another example of this technology is described in US2005/0260123A1, which teaches a process for producing hydrogen, by the use of catalysts that comprise Rh on supports, such as cerium oxide, and is carried out in autothermal conditions with introduction of oxygen into the reaction gas.

Although the use of oxygen in the feed has advantages, such as supplying the heat of reaction through reactions of combustion, and assisting in the removal of the coke deposit on the catalyst, it is not a practical method for the large-scale production of hydrogen, owing to the cost associated with the production of oxygen and purification of the hydrogen, when using air in place of oxygen. This method would be difficult to apply in existing industrial units for production of hydrogen by steam reforming, owing to the high capital expenditure required for equipment modification.

A possible technique for the production of hydrogen from ethanol would be its prior conversion to raw materials that are already used for large-scale production of hydrogen, such as naphtha, natural gas or light hydrocarbons, methane, ethane, propane and butane. After a first step of prior conversion of ethanol, the hydrocarbon stream would feed a conventional process for production of hydrogen, where the hydrocarbons would be converted to a mixture of $H_2$, CO, $CO_2$ and residual methane. In the end of the process, the $H_2$ (or the $H_2$/CO mixture if desired) would be purified by conventional techniques of absorption on amines or by means of PSA—pressure swing adsorption.

The US2006/0057058A1 teaches a method for the production of hydrogen-rich gas from ethanol characterized by:

a) a first step in which ethanol, steam and recycle hydrogen feed a reactor, where the catalytic steps of dehydrogenation of ethanol to ethylene and of hydrogenation of ethylene to ethane take place, wherein the catalyst comprises Pt, Pd or Cu on a support selected from the group comprising alumina, silica-alumina, zirconia and zeolites, in particular zeolite HZSM5;

b) a second step of adiabatic pre-reforming wherein the ethane-rich stream is transformed to a methane-rich stream;

c) feed of the methane-rich stream in a typical configuration of industrial units for steam reforming, containing a primary reformer and a reactor.

The invention does not report data on the stability of the catalysts. The hydrogen produced in accordance with this invention supplies a fuel cell and is therefore suitable for small-scale use.

WO2009/130197 discloses a method for the conversion of ethanol to methane, in a pre-reformer. According to the method, ethanol and steam are reacted on a catalyst that comprises platinum on a support of $ZrO_2$ and $CeO_2$, in the temperature range from 300° C. to 550° C.

The work by S. Freni, N. Mondelo, S. Cavallaro et al., React. Kinet. Catal. Lett, 71 (2000) 143, describes the use of a first step of conversion of ethanol to acetaldehyde, in the presence of steam and hydrogen, on a catalyst of the Cu type supported on silica, at temperatures between 300° C. and 400° C., followed by the reaction of steam reforming of the reaction mixture on a catalyst of the Ni type supported on magnesium oxide.

The specialized literature also teaches a two-stage processes for the production of hydrogen from ethanol. However, these processes have drawbacks, related to the use of noble metals catalysts and of the production of intermediates. These lack of experience on their impact on the performance of the usual catalysts for steam reforming, hence tests are required for evaluating the durability of the catalytic systems and their applicability in existing units.

SUMMARY OF THE INVENTION

The invention is a process for producing hydrogen from ethanol and the catalytic system used in such process. The core of the process is the conversion of ethanol to a methane-rich gas, free from olefins (<1%), with low contents of carbon monoxide (<2%) and other organic contaminants, such as acetaldehyde.

The process can be implemented in existing industrial units of hydrogen production, by replacing the catalysts of the pre-treatment section (usually ZnO and CoMo) and conditions described therein.

DETAILED DESCRIPTION OF THE INVENTION

The process for producing hydrogen from ethanol using a nickel-based catalysts is described hereinafter, the process comprising two steps.

In the first step, a pre-reforming process comprises reactions that produce a gas with high methane content. In the second step, a typical configuration of the steam reforming process is suitable for receiving the product generated in the first step. Therefore, the present invention can be implemented in existing industrial units for production of hydrogen by replacing the catalysts of the pre-treatment section or of the pre-reforming section with suitable catalysts and appropriate process conditions, for carrying out the first step.

In the first step, ethanol is converted to a gas with high methane content, free from olefins and with low content of carbon monoxide (less than 2% v/v of this component based on dry material), in the presence of hydrogen with $H_2$/ethanol molar ratios between 0.1 and 1.0, preferably between 0.2 and 0.6, steam with $H_2O$/ethanol molar ratios between 1 and 10, temperatures between 300 and 550° C., preferably between 350 and 450° C. and space velocities (LHSV taking only ethanol into account) between 0.1 and 10 h$^{-1}$, preferably between 0.5 and 3 h$^{-1}$, in the presence of a nickel-based catalyst.

The operating pressure can be that of common practice for the steam reforming process, i.e. between 1 and 40 kgf/cm$^2$, preferably between 10 and 25 kgf/cm$^2$, the maximum value being limited by the mechanical resistance of the materials of the industrial unit.

In the second step, the gas with high methane content is used as feed for production of hydrogen by the steam reforming process. A typical configuration of steam reforming processes, commonly used, is suitable for receiving the gas with high methane content generated in the first step, and the process comprises the following steps:

a) primary reforming wherein a mixture of steam and gas with high methane content is converted to a mixture with high contents of $H_2$, CO and $CO_2$ and low methane content, at reaction temperatures between 500 and 850° C. and pressures between 10 and 40 kgf/cm$^2$;

b) "shift" wherein CO reacts with steam at temperatures between 300 and 450° C. and pressures between 10 and 40 kgf/cm$^2$;

c) purification wherein by means of the pressure swing adsorption technique, producing a stream of above 99% of hydrogen and a residual gas comprising $H_2$, CO, $CO_2$ and methane, wherein the residual gas is used as fuel in the primary reforming step.

Other known steam reforming process can be used for processing the gas with high methane content generated in the first step of the process, such as those including reactors for pre-reforming, secondary reforming, medium-temperature shift—MTS, low-temperature shift—LTS and methanation and purification of the hydrogen-rich gas by means of aqueous solutions of amines. It is also possible to use configurations of steam reforming for the production of synthesis gas, such as streams containing hydrogen, significant contents of CO for use in petrochemical processes such as the production of methanol or in Fischer-Tropsch processes.

The catalysts comprise nickel on an inorganic support of low acidity, selected from zinc oxide, calcium titanate and calcium or magnesium aluminate, or mixtures thereof, and the support can be modified with alkali metals, in particular by adding potassium, to attain a potassium content between 0.1 and 10%, preferably between 1 and 5% wt.

The process for preparation of the nickel-based catalyst supported on inorganic oxides for use in the process claimed by the present invention comprises the following steps:

1) preparation of a solution of an inorganic nickel salt, preferably nitrate, acetate or carbonate, which can contain one or more elements of the lanthanides group (or rare earths), preferably lanthanum or cerium;

2) impregnation of the inorganic oxide support by known pore volume techniques (wet point) or by the solution excess method;

3) drying of the inorganic oxide material impregnated with solution containing nickel in air, at temperatures between 80° C. and 140° C., for 1 to 24 hours;

4) calcination of the impregnated inorganic oxide material in air, between 350 and 650° C., for 1 to 4 hours.

Alternatively, steps 2 to 4 can be repeated more than once until the desired content of NiO in the support is reached. The desired contents are between 10 and 40% wt of NiO, preferably between 12 and 20% wt. Moreover, additives used in impregnation can include compounds for controlling pH, for increasing solubility or for preventing precipitation of phases. Non-limiting examples of these compounds are nitric acid, sulphuric acid, phosphoric acid, ammonium hydroxide, ammonium carbonate, hydrogen peroxide ($H_2O_2$), sugars or combinations of these compounds. Optionally, an alumina content between 5 and 50% wt is added during preparation of the support, to give the catalysts adequate mechanical strength for industrial use. The particles of the support can be in various forms suitable for industrial use in the steam reforming process, such as spheres, cylinders, cylinders with a central hole (Raschig rings) and cylinders with various holes.

The nickel oxide catalysts on the support require transformation to the active phase of metallic nickel on the support. The transformation, called reduction, can be carried out prior to feed of ethanol and steam, by passage of a hydrogen stream or of a reducing agent such as ammonia, methanol or acetaldehyde, in temperature conditions between 300 and 550° C. Optionally, the catalyst can be reduced externally, as the final step in its production process, by passage of a hydrogen stream or of a reducing agent such as ammonia, methanol or acetaldehyde, in temperature conditions between 300 and 550° C., for 1 to 5 hours, and then cooling and submitting to an air stream at temperatures between 20 and 60° C., for 1 to 5 hours. Optionally, the catalysts can contain low contents of precious metals, particularly Pd and Pt at contents below 0.5% wt, or preferably below 0.1% wt, to speed up the reduction step.

The catalysts prepared in this way can be used in the production of a gas with high methane content, content of olefins below 1% wt and with low CO content, at pressures between 1 and 50 kgf/cm and temperatures between 300 and 550° C., from a mixture of ethanol, hydrogen and steam with $H_2$/ethanol molar ratios between 0.2 and 0.6 and $H_2O$/ethanol molar ratios between 1 and 10, which permit operation for long periods without loss of performance through coke formation. The gas with high methane content can be used for the production of hydrogen by the steam reforming process.

The present invention also envisages, optionally, the use of commercial catalysts classified as "methanation catalysts" or of catalysts classified as "pre-reforming catalysts", both based on nickel, used in the process conditions of the prior art.

The following examples are presented for more complete illustration of the nature of the present invention and its manner of implementation, but are not to be regarded as limiting its scope.

EXAMPLES

Example 1

This comparative example of the prior art teaches that the commercial adsorbents based on zinc oxide and the commercial hydrofining catalysts containing cobalt and molybdenum, both used industrially in the steam reforming process in the step of pre-treatment of feeds of the steam reforming process, are not suitable for processing a feed of ethanol and hydrogen, since they have a high rate of formation of ethylene and of other by-products, particularly acetaldehyde, even when a high $H_2$/ethanol molar ratio is used in the feed (Table 1).

TABLE 1

Distribution of hydrocarbons in the gaseous phase obtained in the conversion of ethanol in the presence of hydrogen on zinc oxide adsorbents and hydrofining catalysts used in the industrial steam reforming process.

| | EXAMPLE | | | | |
|---|---|---|---|---|---|
| | 1.1 | 1.2 | 1.3 | 1.4 | 1.5 |
| Adsorbent/catalyst | HTZ-3 | Zinox 380 | Zinox 390 | HS110 | HS110 |
| Type | ZnO | ZnO | ZnO | CoMo/ZnO | CoMo/ZnO |
| Manufacturer | Haldor Topsoe | Oxiteno | Oxiteno | Oxiteno | Oxiteno |
| Temperature (° C.) | 400 | 400 | 400 | 400 | 400 |
| Pressure (atm) | 1 | 1 | 1 | 1 | 1 |
| Conversion (%) | 57.4 | 68.6 | 72.6 | 74.4 | 77.7 |
| $H_2$/ethanol (mol/mol) | 250 | 250 | 250 | 250 | 0 |
| Steam/ethanol (mol/mol) | 2.8 | 2.8 | 2.8 | 2.8 | 2.8 |
| Selectivities (%) | | | | | |
| Methane | 0.2 | 0.3 | 0.3 | 1.0 | 3.0 |
| Ethylene | 31.7 | 19.3 | 24.3 | 12.6 | 28.0 |
| Ethane | 0.0 | 0.0 | 0.0 | 15.5 | 0.0 |
| Propylene and butylenes | 3.4 | 2.7 | 7.8 | 8.0 | 9.2 |
| Propane and butanes | 0.2 | 5.2 | 0.5 | 1.0 | 3.2 |
| Acetaldehyde | 45.4 | 50.6 | 45.6 | 45.3 | 32.2 |
| Ethyl ether | 0.4 | 0.9 | 1.2 | 0.3 | 1.3 |
| Not identified | 0.3 | 1.4 | 0.8 | 1.0 | 2.4 |
| Ethyl acetate | 6.4 | 7.1 | 6.2 | 8.6 | 6.9 |
| Acetic acid | 5.8 | 5.8 | 6.3 | 0.8 | 3.7 |
| n-Butanol | 0.3 | 2.3 | 0.8 | 0.8 | 0.9 |
| Gasoline | 5.7 | 4.4 | 6.1 | 5.1 | 8.7 |
| Diesel | 0.2 | 0.1 | 0.1 | 0.0 | 0.6 |
| Residue | 0.0 | 0.0 | 0.0 | 0.0 | 0.0 |
| Total | 100 | 100 | 100 | 100 | 100 |

Notes:
a) values obtained for reaction time of 15 minutes;
b) GHSV = 23 000 l/kgh.

These by-products are undesirable as they promote early deactivation of the catalyst used or of steam reforming catalysts used subsequently in the process.

The results were obtained in a small-scale unit operating at atmospheric pressure.

The catalysts were milled to a range between 100 and 150 mesh. The ethanol was fed, by passage of the carrier gas (hydrogen or nitrogen), through a saturator maintained at 10° C.

The feed and the product formed were analysed by gas chromatography.

Example 2

This comparative example teaches that the commercial adsorbents based on zinc oxide and the hydrofining catalysts containing cobalt and molybdenum, which are used in the step of pre-treatment of feeds of the industrial steam reforming process, are not suitable for processing a feed of ethanol, hydrogen and steam, in temperature conditions used industrially in the pre-treatment reactors, since they lead to a high rate of formation of ethylene and other by-products, particularly acetaldehyde and light olefins.

This example further illustrates the beneficial effect of the presence of steam (comparison between Examples 2.1 and 2.2) and of reduction of the space velocity (comparison between Examples 2.4 and 2.5) in reducing the formation of ethylene and other light olefins.

The catalysts were tested by methods similar to those described in Example 1.

The present invention claims replacement of the catalysts based on ZnO and for hydrofining of the section for pre-treatment of the feed, with nickel-based catalysts prepared according to the present invention as a solution for the production of ethanol in existing steam reforming units.

TABLE 2

Distribution of hydrocarbons in the gas phase obtained in the conversion of ethanol in the presence of hydrogen and steam on zinc oxides and hydrofining catalysts, both commercial (Oxiteno), used in the industrial steam reforming process.

| | EXAMPLE | | | | |
|---|---|---|---|---|---|
| | 2.1 | 2.2 | 2.3 | 2.4 | 2.5 |
| Catalyst | Zinox 390 | Zinox 390 | Zinox 390 | HS110 | HS110 |
| Type | ZnO | ZnO | ZnO | CoMo/ZnO | CoMo/ZnO |
| Manufacturer | Oxiteno | Oxiteno | Oxiteno | Oxiteno | Oxiteno |
| Temperature (° C.) | 400 | 400 | 400 | 400 | 400 |
| Pressure (atm) | 1 | 1 | 1 | 1 | 1 |
| Conversion (%) | 72.6 | 71.8 | 66.0 | 86.1 | 92.2 |
| $H_2$/ethanol (mol/mol) | 250 | 250 | 250 | 250 | 250 |
| Steam/ethanol (mol/mol) | 0 | 0.4 | 2.8 | 2.8 | 2.8 |
| GHSV (l/kg · h) | 23 000 | 23 000 | 23 000 | 23 000 | 2200 |
| Selectivities (%) | | | | | |
| Methane | 0.3 | 0.3 | 0.7 | 46.7 | 30.6 |
| Ethylene | 24.3 | 19.4 | 16.2 | 17.2 | 12.2 |
| Ethane | 0.0 | 0.0 | 1.0 | 15.7 | 29.6 |
| Propylene and butylenes | 7.8 | 4.7 | 5.7 | 5.4 | 12.5 |
| Propane and butanes | 0.5 | 1.4 | 1.7 | 1.7 | 6.5 |
| Acetaldehyde | 45.6 | 57.5 | 56.2 | 5.3 | 0.0 |

TABLE 2-continued

Distribution of hydrocarbons in the gas phase obtained in the conversion of ethanol in the presence of hydrogen and steam on zinc oxides and hydrofining catalysts, both commercial (Oxiteno), used in the industrial steam reforming process.

| | EXAMPLE | | | | |
|---|---|---|---|---|---|
| | 2.1 | 2.2 | 2.3 | 2.4 | 2.5 |
| Ethyl ether | 1.2 | 0.6 | 1.6 | 0.0 | 1.4 |
| Not identified | 0.8 | 0.4 | 3.6 | 1.0 | 0.0 |
| Ethyl acetate | 6.2 | 5.7 | 5.0 | 0.0 | 0.0 |
| Acetic acid | 6.3 | 6.9 | 5.4 | 0.0 | 0.0 |
| n-Butanol | 0.8 | 0.3 | 1.1 | 0.0 | 2.7 |
| Gasoline | 6.1 | 2.8 | 2.2 | 6.9 | 4.3 |
| Diesel | 0.1 | 0.0 | 0.0 | 0.0 | 0.0 |
| Residue | 0.0 | 0.0 | 0.0 | 0.0 | 0.0 |
| Total | 100 | 100 | 100 | 100 | 100 |

Notes:
a) Ethanol and water fed by passage of $H_2$ in a saturator maintained at 10° C.
b) Values obtained for reaction time of 15 minutes.

Example 3

This comparative example, according to the present invention, teaches the use of a support of the zinc oxide type, for preparing a catalyst based on nickel oxide and its use in the production of hydrogen from ethanol. The following samples were prepared:
Sample 3A:
  95 g of commercial adsorbent based on zinc oxide (ZINOX390) was impregnated by the incipient impregnation method with 38 ml of aqueous solution containing 19.5 g of Ni(NO3)2.6H2O. Then the sample was dried at 110° C. overnight and was calcined at 450° C. in air for 4 hours to obtain 5% wt of NiO supported on zinc oxide;
Sample 3B:
  94 g of the catalyst from Example 5 was impregnated by the incipient impregnation method with 40 ml of aqueous solution containing 21.4 g of Ni(NO3)2.6H2O. Then the sample was dried at 110° C. overnight and was calcined at 450° C. in air for 4 hours to obtain 10% wt of NiO supported on zinc oxide;
Sample 3C:
  95 g of the catalyst from Example 6 was impregnated by the incipient impregnation method with 40 ml of aqueous solution containing 21.7 g of nickel nitrate Ni(NO3)2 6H2O. Then the sample was dried at 110° C. overnight and was calcined at 450° C. in air for 4 hours to obtain 15% wt of NiO supported on zinc oxide.

Example 4

This comparative example, according to the present invention, teaches the use of a support of the zinc oxide type promoted with alkali metals, for preparing a catalyst based on nickel oxide and its use in the production of hydrogen from ethanol.

Initially, a zinc oxide support promoted with potassium was prepared as follows: 150 g of commercial adsorbent based on zinc oxide (ZINOX390) was impregnated with 60 ml of aqueous solution containing 3.1 g of potassium hydroxide; then the sample was dried at 110° C. overnight and was calcined at 450° C. for 4 hours, obtaining 2% of $K_2O$ on zinc oxide. Then various catalysts containing nickel oxide were prepared from this support, as described below:
Sample 4A:
  95 g of the material prepared in Example 8 was impregnated by the incipient impregnation method with 28 ml of aqueous solution containing 19.5 g of Ni(NO3)2 6H2O. Then the sample was dried at 110° C. overnight and was calcined at 450° C. in air for 4 hours, obtaining 5% wt of NiO supported on zinc oxide promoted with potassium.
Sample 4B:
  87 g of the catalyst from Example 8 was impregnated by the incipient impregnation method with 37 ml of aqueous solution containing 19.9 g of nickel nitrate Ni(NO3)2 6H2O. Then the sample was dried at 110° C. overnight and calcined at 450° C. in air for 4 hours, obtaining 10% wt of NiO supported on zinc oxide promoted with potassium.
Sample 4C:
  79 g of the catalyst from Example 8 was impregnated by the incipient impregnation method with 26 ml of aqueous solution containing 20.2 g of nickel nitrate Ni(NO3)2 6H2O. Then the sample was dried at 110° C. overnight and calcined at 450° C. in air for 4 hours, obtaining 15% wt of NiO supported on zinc oxide promoted with potassium.

Example 5

The catalysts prepared in Examples 3 and 4 were reduced beforehand in a stream of hydrogen and steam at 450° C. for 2 hours and then were tested in the same way as described in Example 1.
The results are presented in Table 3 and show that:
a) introduction of nickel oxide in the formulation of a support of the zinc oxide type produced a catalyst that promotes the reduction of molecules of by-products, especially ethylene and acetaldehyde, with the additional advantage of increasing the activity of ethanol conversion;
b) introduction of potassium in the nickel-oxide-based catalyst on zinc oxide causes an additional reduction of the content of ethylene and other olefins, which are the main compounds that accelerate the formation of coke in the conditions of conversion of ethanol to synthesis gas.

Example 6

This comparative example demonstrates that commercial catalysts for steam reforming of natural gas and naphtha shows increased deactivation noted by the pronounced drop in conversion in Table 4, when used for steam reforming of ethanol in the presence of hydrogen and in the temperature conditions prevailing in the pre-treatment section of existing units for generating hydrogen.
The catalysts were reduced beforehand in a stream of hydrogen and steam at 450° C. for 2 hours and then tested in the manner described in Example 1.

TABLE 3

Distribution of hydrocarbons in the gas phase obtained in the conversion of ethanol in the presence of hydrogen and steam. Steam/ethanol molar ratio of 2.8, $H_2$/ethanol molar ratio of 250, GHSV of 23 000 l/gh, temperature of 400° C. and pressure of 1 atm.

| | SAMPLE | | | | | | |
|---|---|---|---|---|---|---|---|
| | 2 | 3A | 3B | 3C | 4A | 4B | 4C |
| Reaction time (min) | 15 | 15 | 15 | 15 | 15 | 15 | 15 |
| % NiO | 0 | 5 | 10 | 15 | 5 | 10 | 10 |
| % $K_2O$ | 0 | 0 | 0 | 0 | 1.9 | 1.8 | 1.7 |
| Conversion (%) | 66 | 100 | 100 | 100 | 93 | 92 | 83 |
| | | | Selectivities (%) | | | | |
| Methane | 0.7 | 82.3 | 85.6 | 83.5 | 86.8 | 77.8 | 36.8 |
| Ethylene | 16.2 | 4.2 | 1.4 | 1.1 | 0.7 | 0.6 | 0.3 |
| Ethane | 1.0 | 0 | 0 | 0 | 0.7 | 0.8 | 0 |
| Propylene and butylenes | 5.7 | 3.7 | 0 | 4.1 | 2.8 | 0 | 38.9 |
| Propane and butanes | 1.7 | 0 | 0 | 0 | 1.2 | 0 | 0 |
| Acetaldehyde | 56.2 | 6.3 | 1.1 | 0 | 2.6 | 13.9 | 21.6 |
| n-Butanol | 1.1 | 0 | 0 | 0 | 0 | 1.8 | 0.8 |
| Gasoline | 2.2 | 3.4 | 11.2 | 11.2 | 5.2 | 5.0 | 1.6 |
| Diesel | 0 | 0 | 0.5 | 0 | 0 | 0 | 0 |
| Others | 15.6 | 0 | 0 | 0 | 0 | 0 | 0 |

Notes:
a) Ethanol and water fed by passage of $H_2$ in a saturator maintained at 10° C.;
b) Values obtained for reaction time of 15 minutes.

TABLE 4

Distribution of hydrocarbons in the gas phase obtained in the conversion of ethanol in the presence of hydrogen and steam on commercial steam reforming catalysts for natural gas (G91EW) or for naphtha (46.3Q) used in the industrial steam reforming process: steam/ethanol molar ratio of 2.8 and $H_2$/ethanol molar ratio of 250.

| | CATALYST | | | |
|---|---|---|---|---|
| | G91EW | | 46.3Q | |
| Type | For natural gas | For natural gas | For naphtha | For naphtha |
| Manufacturer | SudChemie | SudChemie | J. Matthey | J. Matthey |
| Reaction time (min) | 15 | 60 | 15 | 60 |
| Temperature (° C.) | 400 | 400 | 400 | 400 |
| Pressure (atm) | 1 | 1 | 1 | 1 |
| Conversion (%) | 83.3 | 37.0 | 88.2 | 36.9 |
| | Selectivity (%) | | | |
| Methane | 78.1 | 98.8 | 86.2 | 97.1 |
| Ethylene | 0.0 | 0.0 | 1.0 | 1.1 |
| Ethyl ether | 20.1 | 0.0 | 0.0 | 0.0 |
| Ethyl acetate | 0.0 | 0.0 | 1.0 | 0.0 |
| Gasoline | 1.3 | 1.2 | 1.1 | 1.7 |
| Diesel | 0.4 | 0.0 | 0.7 | 0.0 |
| Total | 100 | 100 | 100 | 100 |

Note:
Formation of ethane, propylene and butylenes, propane and butanes, acetaldehyde, acetic acid, n-butanol or other compounds was not observed in quantifiable contents.

Example 7

This example shows that commercial catalysts known in industrial practice as methanation catalysts, originally used in the conversion of carbon monoxide and carbon dioxide with hydrogen, for the production of methane, can, surprisingly, be used, according to the present invention, for the conversion of ethanol to a methane-rich gas that is free from olefins, in the presence of hydrogen and steam and in temperature conditions used in the pre-treatment section of existing units for generating hydrogen by the steam reforming process.

The catalysts were reduced beforehand in a stream of hydrogen and steam at 450° C. for 2 hours and then were tested in the same way as described in Example 1. However, the properties of activity and of deactivation were found to be influenced by the type of commercial catalyst used, indicating that it would be desirable to prepare special catalysts for the conversion of ethanol to hydrogen, as proposed in the present invention.

TABLE 5

Distribution of hydrocarbons in the gas phase obtained in the conversion of ethanol in the presence of hydrogen and steam on commercial methanation catalysts: steam/ethanol molar ratio of 2.8 and $H_2$/ethanol molar ratio of 250.

| | CATALYST | | | | | |
|---|---|---|---|---|---|---|
| | C13-04-04 | C13-04-04 | PK3 | PK3 | R1-10 | R1-10 |
| Manufacturer | Sud Chemie | Sud Chemie | Haldor Topsoe | Haldor Topsoe | BASF | BASF |
| Reaction time (min) | 15 | 60 | 15 | 60 | 15 | 60 |
| Temperature (° C.) | 400 | 400 | 400 | 400 | 400 | 400 |
| Pressure (atm) | 1 | 1 | 1 | 1 | 1 | 1 |
| Conversion (%) | 100 | 100 | 90.1 | 42.1 | 81 | 33 |
| | | | Selectivities (%) | | | |
| Methane | 70.5 | 88.9 | 98.8 | 99.4 | 97.0 | 98.6 |
| Propane and butanes | 25.9 | 10.4 | 0.0 | 0.0 | 0.0 | 0.0 |
| Not identified | 0.2 | 0.0 | 0.0 | 0.0 | 0.0 | 0.0 |
| Gasoline | 3.3 | 0.0 | 1.2 | 0.6 | 1.6 | 1.5 |
| Diesel | 0.0 | 0.0 | 0.0 | 0.0 | 1.3 | 0.0 |
| Total | 100 | 100 | 100 | 100 | 100 | 100 |

Note:
Formation of ethylene, ethane, propylene, butylenes, acetaldehyde, ethyl ether, ethyl acetate, acetic acid, n-butanol or other compounds was not observed in quantifiable contents.

Example 8

This example teaches the preparation of a catalyst, according to the present invention, based on nickel on a support of the alumina type and promoted with alkali metals. 300 g of commercial aluminium hydroxide (PURAL SB, marketed by SASOL) was impregnated with 180 ml of aqueous solution containing 7.1 g of potassium hydroxide. Then the sample was dried at 110° C. for 12 hours and was calcined in air at 1200° C., for 4 hours, obtaining a support of the alumina type promoted with potassium. Next, the sample was impregnated by the incipient impregnation method, with aqueous solution containing nickel nitrate, it was dried at 110° C. and calcined at 450° C. The procedure was repeated two more times, to obtain a catalyst containing 15% wt of NiO (15% NiO/2% K/alumina).

Example 9

This example teaches the preparation of a catalyst, according to the present invention, based on nickel on a support of the magnesium aluminate type and promoted with alkali metals. Initially, a support of the magnesium aluminate type was prepared by the following steps:

a) mix an aqueous solution of $Al(NO_3)_3$ $9H_2O$ with an aqueous solution of Mg(NO3)2.6$H_2O$, at room temperature;

b) add the above solution to an aqueous solution containing 14.5% of NH$_4$OH, maintaining the pH equal to or above 8.0;
c) filter and wash the precipitate formed with demineralized water;
d) dry at 110° C. and calcine in air between 1000° C. and 1300° C. for 1 to 4 hours (in the example, the solutions contain 543 g of aluminium nitrate in 1435 ml of water and 176 g of magnesium nitrate in 679 ml of water, respectively).

The calcination temperature used was 1100° C. Once prepared, the support was impregnated by the pore volume method with aqueous solution of KOH and then calcined at 1200° C. for 4 hours, obtaining a support with 1.5% wt of KOH. Then 112 g of the support thus obtained was impregnated with 39 ml of aqueous solution containing 23 g of Ni(NO3)2.6H$_2$O. The material was dried and was calcined at 450° C. for 4 hours, obtaining 5% wt of NiO supported on magnesium aluminate promoted with potassium. The procedure was repeated until 15% wt of NiO supported on magnesium aluminate promoted with potassium was obtained.

Example 10

This example teaches the preparation of a catalyst, according to the present invention, based on nickel on a support of the calcium aluminate type and promoted with alkali metals. 300 g of commercial calcium aluminate (SECAR 80) was impregnated by the pore volume method with aqueous solution of KOH and was then calcined at 1200° C. for 4 hours, obtaining a support of calcium aluminate promoted with 1.5% wt of KOH. 114 g of the support thus obtained was impregnated with 31 ml of an aqueous solution containing 23 g of Ni(NO3)2.6H$_2$O. The material was dried and was calcined at 450° C. for 4 hours, obtaining 5% of NiO supported on calcium aluminate promoted with potassium. The procedure was repeated until 15% wt of NiO supported on calcium aluminate promoted with potassium was obtained.

Example 11

This example teaches the preparation of a catalyst, according to the present invention, in the preferred embodiment thereof, based on nickel on supports of the alkali metal titanate type. 190 g of commercial calcium titanate (Certronic) was impregnated with 68 ml of an aqueous solution containing 39 g of Ni(NO3)2.6H$_2$O. Then the sample was dried at 110° C. overnight and was calcined at 450° C. in air for 4 hours, obtaining 5% wt of NiO supported on calcium titanate. The procedure was repeated two more times, to obtain a catalyst containing 15% wt of NiO supported on calcium titanate.

Example 12

This example teaches the preparation of a catalyst, according to the present invention, based on nickel on a support of the alumina-calcium type. 235 g of alumina CATAPAL was impregnated with 141 ml of aqueous solution containing 63 g of Ca(NO3)2.4H$_2$O. Then the sample was dried at 110° C. overnight and was calcined at 600° C. for 4 hours in air. 230 g of the above support was impregnated by the pore volume method with 160 ml of aqueous solution containing 99.4 g of Ni(NO3)2.6H$_2$O. Then the sample was dried at 110° C. overnight and was calcined at 450° C. in air for 4 hours, obtaining 10% wt of NiO supported on alumina. The procedure for impregnation and calcination was repeated, obtaining the final catalyst containing 20% wt of NiO supported on calcium-modified alumina.

Example 13

This comparative example (Table 6) demonstrates that preferred catalysts of the present invention constituted of nickel on supports of low acidity display increased stability and selectivity, for the production of gas with high methane content and free from olefins, in the temperature conditions prevailing in the pre-treatment section of existing units for generating hydrogen. The catalysts were reduced beforehand in a stream of hydrogen and steam at 450° C. for 2 hours, and then were tested as described in Example 1.

TABLE 6

Distribution of hydrocarbons in the gas phase obtained in the conversion of ethanol in the presence of hydrogen and steam on catalysts constituted of nickel on supports of low acidity.

| | CATALYST | | | | |
| --- | --- | --- | --- | --- | --- |
| | EX. 8 | EX. 9 | EX. 10 | EX. 11 | EX. 12 |
| Type | Ni/K/Al$_2$O$_3$ | Ni/K/ magnesium aluminate | Ni/K/ calcium aluminate | Ni/ calcium titanate | Ni/ calcium- alumina |
| Temperature (° C.) | 400 | 400 | 400 | 400 | 400 |
| Pressure (atm) | 1 | 1 | 1 | 1 | 1 |
| Conversion (%) | 100 | 100 | 100 | 100 | 100 |
| H$_2$/ethanol (mol/mol) | 250 | 250 | 250 | 250 | 250 |
| Steam/ethanol (mol/mol) | 2.8 | 2.8 | 2.8 | 2.8 | 2.8 |
| GHSV (l/kg · h) | 23 000 | 23 000 | 23 000 | 23 000 | 23 000 |
| Selectivities (%) | 100 | 100 | 100 | 100 | 100 |
| Methane | 100 | 100 | 100 | 100 | 100 |
| Total | 100 | 100 | 100 | 100 | 100 |

Notes:
a) Ethanol and water fed by passage of H2 in a saturator maintained at 10° C.;
b) b) Values obtained for reaction time of 15 minutes.

The results show that it is possible to obtain an active, stable and selective catalyst for the production of methane from a mixture of ethanol, hydrogen and steam.

The catalyst according to the present invention is constituted of Ni on supports comprising alumina, calcium aluminates, magnesium aluminates and calcium titanates, and can be promoted with alkali metals, such as potassium.

Example 14

This example shows that, according to the present invention, the use of hydrogen, with molar ratios between 0.1 and 1.0 in a mixture of ethanol and steam, is essential for preventing coke formation. In practice, a typical molar ratio between 0.01 and 0.05 is used industrially in the steam reforming of natural gas and between 0.1 and 0.3 for the steam reforming of naphtha. The reaction was carried out in a pilot plant using 2 g of catalyst, pressure of 10 kgf/cm$^2$, temperature of 400° C., solution 30% wt of ethanol in water (equivalent to steam/carbon molar ratio of 3.0, LHSV of 9 h$^{-1}$ (calculated on the basis of a mixture of ethanol and water).

Tables 7 and 8 show the results obtained with commercial catalysts for pre-reforming and methanation, respectively, that are typically used in the production of hydrogen by the steam reforming process. The catalysts for pre-reforming and methanation were used in the steps for production of a gas with high content of H$_2$, from natural gas, GLP or naphtha.

TABLE 7

Test of stability of conversion of ethanol and steam to a gas with high methane content as a function of the $H_2$/ethanol molar ratio on commercial pre-reforming catalysts. The catalyst RKNGR was reduced at 450° C. and the catalyst Reformax at 550° C. before the start of the reaction.

| | RUN | | | | |
|---|---|---|---|---|---|
| | A | A | A | B | C |
| Manufacturer | Haldor Topsoe | Haldor Topsoe | Haldor Topsoe | Sud Chemie | Sud Chemie |
| Application | Pre-reforming naphtha | Pre-reforming naphtha | Pre-reforming naphtha | Pre-reforming naphtha | Pre-reforming naphtha |
| Catalyst | RKNGR | RKNGR | RKNGR | Reformax 100 | Reformax 100 |
| T (° C.) | 400 | 400 | 400 | 450 | 450 |
| $H_2$/ethanol (mol/mol) | 0.6 | 0.4 | 0 | 0.6 | 0 |
| Stability | Without signs of pressure loss or deactivation after 9 days of operation | Pressure loss above 10 kgf/cm² was observed after 02 days of operation | Pressure loss above 10 kgf/cm² was observed after 01 day of operation | Without signs of pressure loss or deactivation after 04 days of operation | Pressure loss above 10 kgf/cm² was observed after 05 hours of operation |
| | | | Gas phase (% vol) | | |
| $H_2$ | 72.8 | 63.8 | | 72.3 | 65.3 |
| CO | 0 | 0.1 | | 0 | 0.8 |
| $CO_2$ | 0 | 0.0 | | 0.1 | 12.4 |
| $CH_4$ | 27.2 | 36.1 | | 27.5 | 21.5 |

Example 15

This example shows the use of the catalysts, according to the present invention, in the preferred embodiment thereof, of the Ni type on supports of low acidity. The reaction conditions are as described in Example 14. The results show excellent stability without increase in pressure loss, which is indicative of formation of coke on the catalysts (Table 9).

TABLE 8

Test of stability of conversion of ethanol and steam to a gas with high methane content as a function of the $H_2$/ethanol molar ratio on commercial methanation catalysts (C13-4-04 Sud Chemie).

| | RUN | | | | | |
|---|---|---|---|---|---|---|
| | A | B | C | D | E | F |
| T (° C.) | 400 | 400 | 400 | 400 | 550 | 400 |
| V/C (mol/mol) | 3 | 3 | 3 | 3 | 3 | 2 |
| $H_2$/ethanol (mol/mol) | 0.6 | 0.45 | 0.3 | 0 | 0 | 0 |
| Stability | Without signs of pressure loss after 15 days of operation | Without signs of pressure loss after 10 days of operation | Without signs of pressure loss after 15 days of operation | Pressure loss around 10 kgf/cm2 after 6 days of operation | Pressure loss above 10 kgf/cm2 after 4 days of operation | Pressure loss above 10 kgf/cm2 after 2 days of operation |
| | | | Gas phase (% v/v) | | | |
| $H_2$ | n.a. | n.a. | n.a. | 34.6 | 54.6 | 34.5 |
| CO | n.a. | n.a. | n.a. | 0.14 | 1.5 | 0.14 |
| $CO_2$ | n.a. | n.a. | n.a. | 20.3 | 19.5 | 20.3 |
| $CH_4$ | n.a. | n.a. | n.a. | 44.9 | 24.5 | 45.0 |

Note:
n.a. = not analysed.

TABLE 9

Test of stability of the Ni-based catalysts on supports of low acidity in the conversion of ethanol and steam to a gas with high methane content. The catalysts were reduced at 450° C. before the start of the reaction.

| | CATALYST | | |
|---|---|---|---|
| | EX. 10 | EX. 11 | EX. 12 |
| Type | Ni/K/calcium aluminate | Ni/calcium titanate | Ni/calcium-alumina |
| T (° C.) | 400 | 400 | 400 |
| $H_2$/ethanol (mol/mol) | 0.6 (4 days) 0.3 (4 days) | 0.6 | 0.6 |
| Stability | Without signs of pressure loss after 8 days of operation | Without signs of pressure loss after 5 days of operation | Without signs of pressure loss after 5 days of operation |
| $H_2$ | 72.2 | 74.6 | 70.9 |
| CO | 0 | 0.3 | 0.3 |
| $CO_2$ | 0 | 2.0 | 0 |
| $CH_4$ | 27.7 | 23.1 | 28.6 |

The invention claimed is:

1. Process for producing hydrogen from ethanol, for implementation in industrial units for production of hydrogen, already existing or not, replacing catalysts of a pre-treatment section or of a pre-reforming section with nickel-based catalysts, characterized in that it comprises the following steps:
   a) provide a reactor with a catalytic system, wherein said catalytic system comprises a nickel oxide catalyst on a support selected from the group consisting of alumina, calcium aluminate, magnesium aluminate, alkali metal titanate and mixtures of these compounds in any proportions, and with a promoting element selected from the group consisting of alkali metals and alkaline-earth metals;
   b) provide said reactor with an ethanol feed, with a space velocity (LHSV) between 0.1 and 10 $h^{-1}$ and allow contact with the catalytic system;
   c) provide said reactor simultaneously with steps (a) and (b) with a hydrogen feed, to establish an $H_2$/ethanol molar ratio between 0.1 and 1.0;
   d) provide said reactor simultaneously with steps (a), (b) and (c) with a steam feed, to establish a steam/ethanol molar ratio between 1.0 and 10.0;
   e) adjust the operating conditions of the reactor to a temperature between 300 and 600° C.;
   f) allow the conversion of ethanol to a stream containing methane, CO, CO2, H2 and less than 1% olefins in the conditions established in the preceding steps;
   g) send the mixture of gases produced in step (f) to a unit operating under typical conditions of primary reforming of the industrial steam reforming process to permit the conversion of the methane to CO, $CO_2$ and $H_2$;
   h) treat the mixture of gases produced in step (g) by means of typical conditions of the "shift" step of the industrial steam reforming process, to permit the conversion of carbon monoxide to $CO_2$ and hydrogen;
   i) purify the hydrogen produced, derived from the shift reactor, by the methods used in the industrial steam reforming process.

2. Process according to claim 1, characterized in that said ethanol feed comprises anhydrous ethanol, hydrated ethanol or crude ethanol.

3. Process according to claim 1, characterized in that said hydrogen feed comprises the recycle of the product obtained in said conversion of ethanol.

4. Process according to claim 1, characterized in that said nickel oxide is present in the catalyst at a content between 10 and 60% wt.

5. Process according to claim 1, characterized in that said promoting element of alkaline-earth metal comprises calcium, present in the catalyst at a content between 1 and 15% wt.

6. Process according to claim 1, characterized in that said promoting element of alkali metal comprises potassium, present in the catalyst at a content between 1 and 3% wt.

7. Process according to claim 1, characterized in that said catalyst comprises a second metallic element, selected from the group Pt, Pd, Rh or Re, present in the catalyst at a content between 0.01 and 1% wt, relative to the content of metallic Ni, so as to promote the reduction of the metal oxide species in the temperature range between 350° C. and 550° C.

8. Process according to claim 1, characterized in that said support comprises calcium titanate.

9. Process according to claim 1, characterized in that said process is carried out in units for large-scale production of hydrogen or of synthesis gas, by the process of steam reforming of natural gas, naphtha, liquefied petroleum gas or refinery gas.

10. Process according to claim 1, characterized in that the ethanol feed has a space velocity (LHSV) between 0.5 and 3.0 $h^{-1}$.

11. Process according to claim 1, characterized in that the $H_2$/ethanol molar ratio is between 0.2 and 0.6.

12. Process according to claim 1, characterized in that the steam/ethanol molar ratio is between 3.0 and 6.0.

13. Process according to claim 1, characterized in that the operating conditions of the reactor are adjusted to a temperature between 350 and 550° C.

14. Process according to claim 1, characterized in that said nickel oxide is present in the catalyst at a content between 10 and 40% wt.

15. Process according to claim 1, characterized in that said promoting element of alkaline-earth metal comprises calcium, present in the catalyst at a content between 5 and 8% wt.

16. Process according to claim 1, characterized in that said catalyst comprises a second metallic element, selected from the group Pt, Pd, Rh and Re, present in the catalyst at a content between 0.01 and 0.1% wt, relative to the content of metallic Ni, so as to promote the reduction of the metal oxide species in the temperature range between 350° C. and 550° C.

* * * * *